E. R. McCALL.
Gang-Plow Attachments.

No. 150,425.

2 Sheets--Sheet 1.

Patented May 5, 1874.

Witnesses.
C. C. Poole
S. M. Whipple

Inventor.
Edwin R. McCall
By C. B. Woodruff, Attorney

E. R. McCALL.
Gang-Plow Attachments.

No. 150,425. Patented May 5, 1874.

Witnesses.
C. C. Poole
S. M. Whipple

Inventor.
Edwin R. McCall.
By G. B. Woodruff, Attorney.

UNITED STATES PATENT OFFICE.

EDWIN R. McCALL, OF WATERLOO, IOWA.

IMPROVEMENT IN GANG-PLOW ATTACHMENTS.

Specification forming part of Letters Patent No. 150,425, dated May 5, 1874; application filed February 12, 1874.

*To all whom it may concern:*

Be it known that I, EDWIN R. McCALL, of Waterloo, in the county of Black Hawk and State of Iowa, have invented certain new and useful Improvements in Gang-Plow Attachment for adjusting and working two plows at the same time; and the following is a full, clear, and exact description of the same, reference being had to the accompanying drawings making a part of this specification, in which—

Figure 1:
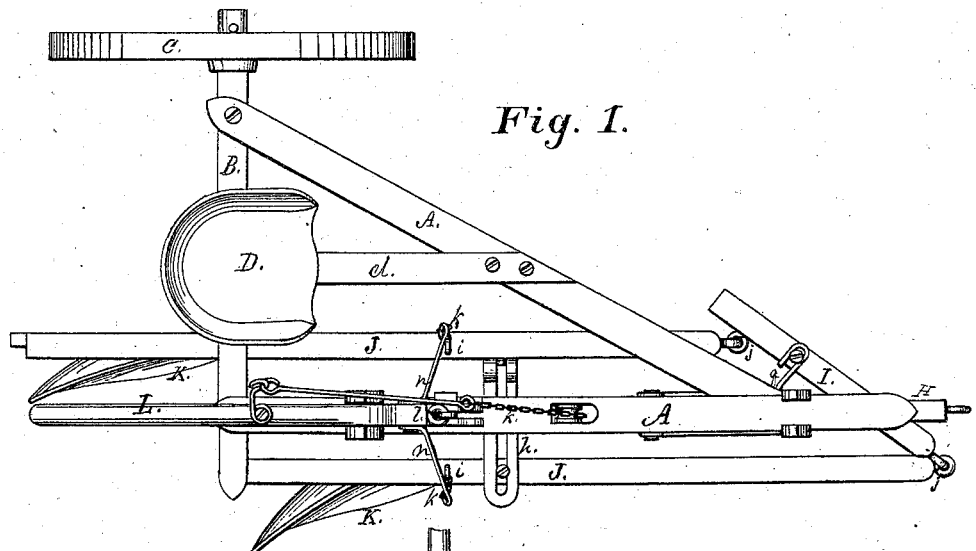
Figure 2:
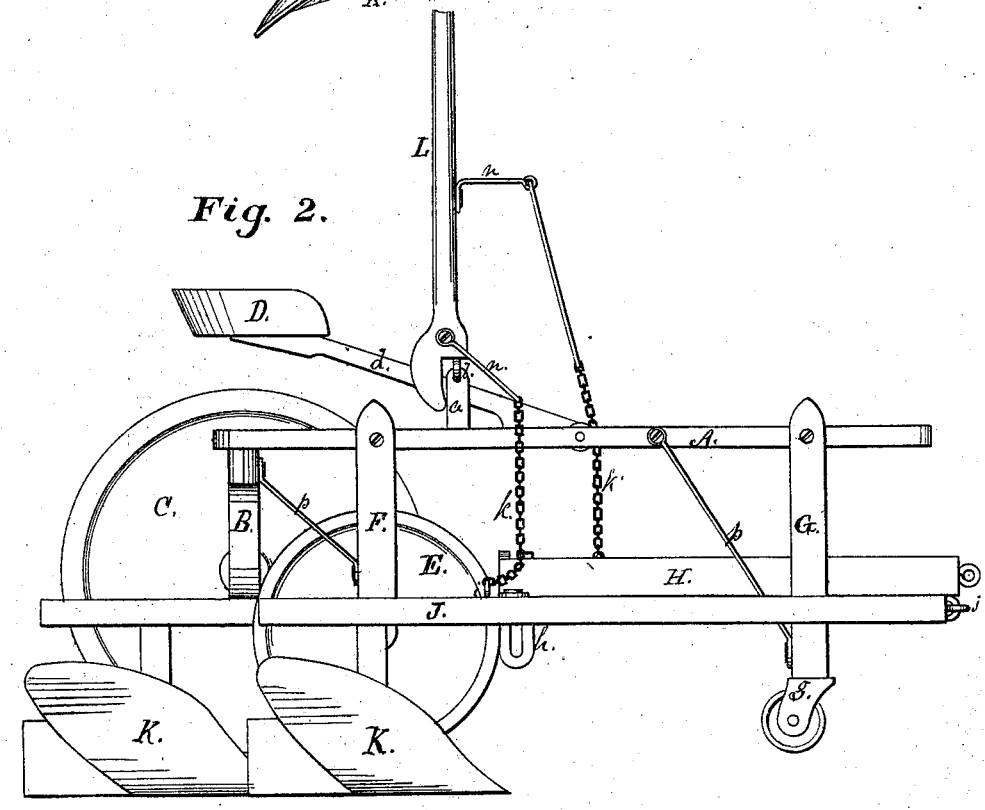
Figure 3:
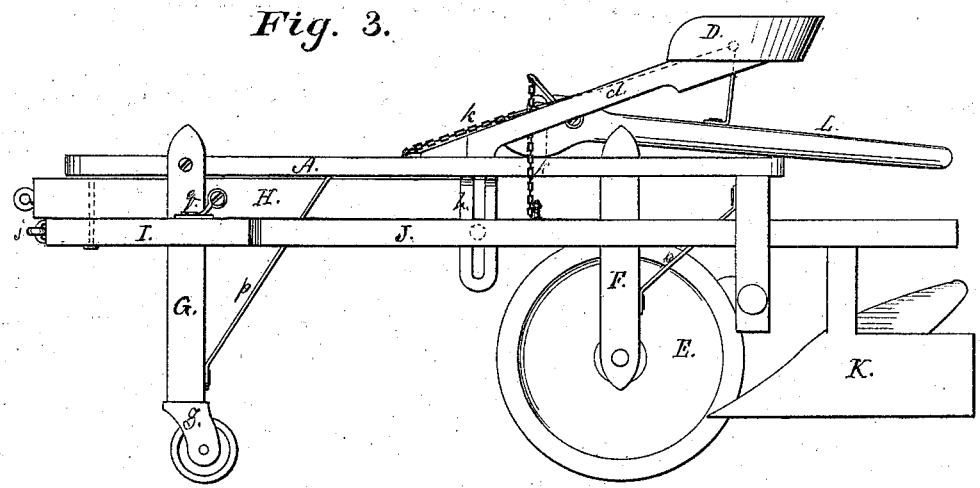
Figures 4, 5:
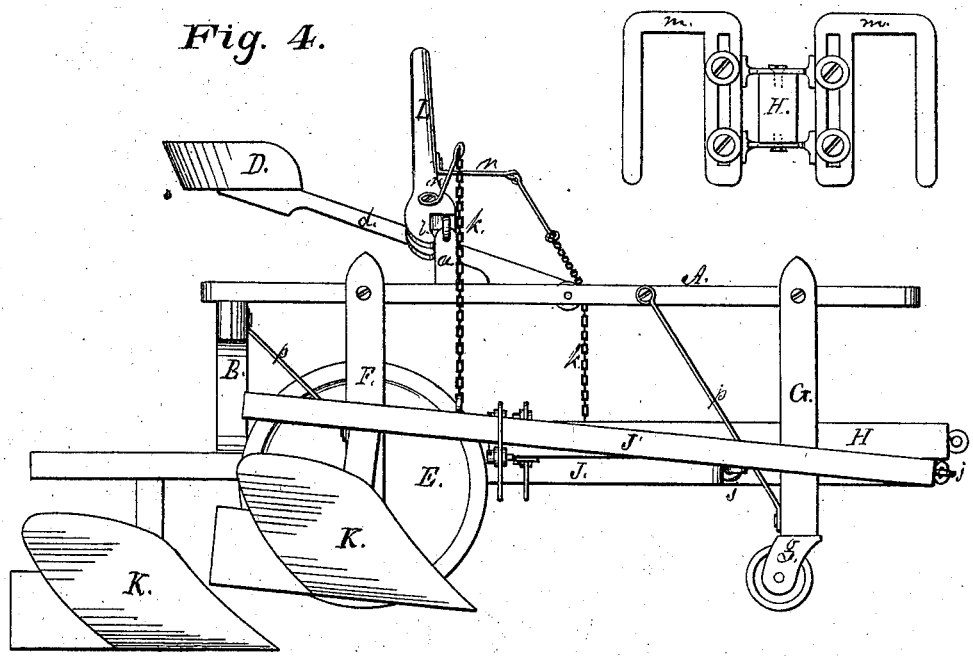

Plate I, Figure 1 represents a plan or top view of my improved gang-plow attachment. Fig. 2 shows a side-view elevation of the same. Plate II, Fig. 3 shows the near-side elevation of the same, with one plow elevated above the ground. Fig. 4 is a view of the reverse side, showing two plows, one of them elevated, while the other is in position for operating. Fig. 5 shows an enlarged detached view of a modification in the plow-adjusting attachment, which may be substituted at pleasure for the device shown in the Figs. 1 and 2 in Plate I, and Fig. 3 on Plate II.

My invention relates to plows which are provided with wheels and a seat, on which the plowman sits to drive his team, and do his plowing; and it consists in the attachment and devices by which the driver, in his seat, controls the movement of one or two plows at pleasure.

To enable others to make and operate my gang-plow attachment, I will describe it more in detail, referring to the drawings and the letters thereon.

I make a frame, A, of hard, tough wood, the rear end of which is supported on the elevated bar or portion of the crank-shaped axle B, on which the larger wheel C revolves. The driver's seat D is also secured to an inclined spring-bar, $d$, and is fastened to the angular side bar of the frame A, about midway, so that the weight of the driver is nearly balanced on all of the wheel-supports. The smaller wheel E is supported and has its journals running in boxes in vertical pieces of timber F, attached to the off-side timber of the frame A, at a suitable distance from the rear end. To the front end of the same timber is attached a slotted post or vertical standard, G, on the bottom of which is secured a caster-roller, $g$. The draft-beam H passes through the slotted standard G, and is secured at its front end to a piece of timber, I, placed obliquely on its under side, to which the plow-beams proper, J J', are attached by links $j\ j'$ at the forward ends, so that the plows are free to move up or down and laterally, as may be required. The plows K K' are secured at the rear ends of the beams J J', which are provided with staples $i\ i$ and chains $k\ k'$, to connect them with the hand-lever L, that is attached by a link, $l$, to a standard, $a$, on the top of the frame A, in such a position as to be convenient to be operated by the driver in his seat D. At the rear end of the draft-beam H is secured a slotted plate, $h$, of such form and in such a manner attached to the plow-beams J J' as to allow them to be adjusted to any suitable width apart, and one or both of them to plow furrows of any desired depth. The modification of the adjusting device and different form of the slotted plates $m\ m$, as shown in Fig. 5, admit of a greater up-and-down movement of the plows, and is intended to be used in rough ground. The hand-lever L, with its arms $n\ n$ and chains $k\ k'$, is so constructed, attached, and arranged as to perform the several functions of lifting either one or both of the plows out of the ground, adjusting the depth of the furrows, and, when it is raised to a vertical position, is free to move laterally either way across the beam, to raise and lower the rear end of each plow separately, and, when it is brought back and down parallel with the timber of the frame A, lifts both plows out of and a sufficient height above the ground to go to and from the field to be plowed, and hold them in that position.

That the frame-work of the carriage and the attachment may be light and of sufficient strength, I employ angular braces $p\ p$, made of metal rods. To support the standards F and G, and at such other places as they may be required, the piece of timber I is secured at any required angle by the length of the hook-fastening $q$, which will give any desired width between the front ends of the plow-beams, and keep the center of draft in position.

What I claim as my invention, and desire to secure by Letters Patent, is—

1. The combination of the draft-beam H, with its adjusting device $h$, connected with the plow-beams J J' and their link attachments $j j'$, with the diagonal timber I, the connecting-chains $k$, arms $n$, and hand-lever L, operating in the manner described.

2. The combination of the frame A, standards F and G, draft-beam H, plow-beams J J', plows K K', lever L, connecting-links $i i$, chains $k k'$, and the adjusting device $h$, substantially as herein shown and described.

In testimony whereof I hereunto subscribe my name in the presence of witnesses.

EDWIN R. McCALL.

Witnesses:
 LORE ALFORD,
 JOHN McCABE.